(12) United States Patent
Noguerol (10) Patent No.: US 10,838,538 B2
(45) Date of Patent: *Nov. 17, 2020

(54) METHOD AND APPARATUS FOR GESTURE-BASED SEARCHING

(71) Applicant: INTERDIGITAL MADISON PATENT HOLDINGS, SAS, Paris (FR)

(72) Inventor: Juan M. Noguerol, Gardena, CA (US)

(73) Assignee: INTERDIGITAL MADISON PATENT HOLDINGS, SAS, Paris (FR)

(*) Notice: Subject to any disclaimer, the term of this patent is extended or adjusted under 35 U.S.C. 154(b) by 549 days.

This patent is subject to a terminal disclaimer.

(21) Appl. No.: 15/586,972

(22) Filed: May 4, 2017

(65) Prior Publication Data

US 2017/0235420 A1 Aug. 17, 2017

Related U.S. Application Data

(63) Continuation of application No. 14/141,085, filed on Dec. 26, 2013, now Pat. No. 9,672,287.

(51) Int. Cl.
| | |
|---|---|
| *G06F 3/041* | (2006.01) |
| *G06F 3/01* | (2006.01) |
| *G06F 16/9535* | (2019.01) |
| *G06F 3/0488* | (2013.01) |

(52) U.S. Cl.
CPC ............ *G06F 3/0416* (2013.01); *G06F 3/017* (2013.01); *G06F 3/04883* (2013.01); *G06F 16/9535* (2019.01)

(58) Field of Classification Search
USPC .......................................................... 707/706
See application file for complete search history.

(56) References Cited

U.S. PATENT DOCUMENTS

| | | | | |
|---|---|---|---|---|
| 7,693,842 | B2* | 4/2010 | Hinckley | G06K 9/6255 707/770 |
| 8,510,653 | B2* | 8/2013 | Sinn | G06Q 30/02 715/277 |
| 8,542,205 | B1* | 9/2013 | Keller | G06F 3/0488 345/173 |
| 8,940,992 | B2* | 1/2015 | Little | G10H 7/00 84/662 |
| 2008/0250012 | A1 | 10/2008 | Hinckley et al. | |
| 2008/0320419 | A1* | 12/2008 | Matas | H04M 1/72572 715/863 |
| 2009/0287680 | A1 | 11/2009 | Paek et al. | |
| 2009/0327976 | A1* | 12/2009 | Williamson | G06F 3/0488 715/863 |

(Continued)

*Primary Examiner* — Kim T Nguyen
(74) *Attorney, Agent, or Firm* — Lily Neff (57) ABSTRACT

A content searching technique that includes sensing at least three types of input gestures from a user, each of the at least three input gestures representative of a respective one of a search term, a class of assets to be searched and a location to be searched. The sensed at least three types of input gestures are translated into the search term, the class of assets to be searched and the location to be searched. The specified location is searched for the class of assets corresponding to the search term. A list of assets residing or available from at the searched location corresponding to the search term are presented in a user interface display.

19 Claims, 9 Drawing Sheets

(56) References Cited

U.S. PATENT DOCUMENTS

| | | |
|---|---|---|
| 2010/0105370 A1 | 4/2010 | Kruzeniski et al. |
| 2012/0197857 A1 | 8/2012 | Huang et al. |
| 2013/0006957 A1* | 1/2013 | Huang .................... G06F 3/017 |
| | | 707/706 |
| 2013/0085848 A1 | 4/2013 | Dyor et al. |
| 2013/0103712 A1* | 4/2013 | Li ....................... G06F 3/04883 |
| | | 707/769 |
| 2014/0052751 A1* | 2/2014 | Zhang .................. G06F 16/436 |
| | | 707/769 |
| 2014/0173426 A1* | 6/2014 | Huang ................. G06F 40/205 |
| | | 715/256 |

\* cited by examiner

"DA" +  + "A" + "Downward Swipe"

Fig. 9A

"WHO" +  + "M" + "C"

METHOD AND APPARATUS FOR GESTURE-BASED SEARCHING

RELATED APPLICATIONS

This application is a continuation of co-pending U.S. application Ser. No. 14/141,085 filed Dec. 26, 2013, and is incorporated in its entirety.

TECHNICAL FIELD OF THE INVENTION

The present disclosure generally relates to content systems and, more particularly, to a system, method and graphic user interface enabling a user to utilize a gesture-based search query when searching for digital content.

BACKGROUND OF THE INVENTION

Home entertainment systems, including television and media centers, are converging with the Internet and providing access to a large number of available sources of content, such as video, movies, TV programs, music, etc. This expansion in the number of available sources necessitates a new strategy for navigating a media interface associated with such systems and enabling access to certain portions of media content being consumed by the user.

The large number of possible content sources creates an interface challenge that has not yet been successfully solved in the field of home media entertainment. This challenge involves successfully presenting users with a large number of elements (programs, sources, etc.) without the need to tediously navigate through multiple display pages or hierarchies of content.

Content search algorithms have been implemented which enable the user to specify search terms relating to content of interest. However, there is a drawback associated with merely entering search terms to search for content that can be desirable to the user. A first drawback is that search algorithms tend to facilitate a global search of all available sources for any item having at least a portion of the entered search term. Often times a global search results in the return of a number of data items that are irrelevant to the user at a given time. For example, these global search algorithms can return data items that are not even multimedia content. A further drawback associated with conventional search technology relates to the difficulty in narrowing the types of data items to be searched and the particular locations to be searched.

An example of the aforementioned drawbacks can be found when considering gesture based searching performed using a device running the ANDROID® or IOS® operating system that executes programs enabling the use of gestures to conduct a search. The problem with such a search is they return ALL results matching the particular search term. This is unduly burdensome to a user and would require much time to sift through to locate any item of relevance. Thus, the drawback associated herewith is the lack of context provided as a result of the gesture search.

SUMMARY

In one embodiment, a method of searching for content data is provided. The method includes sensing at least three types of input gestures from a user, each of the at least three input gestures is representative of a respective one of at least a search term, a class of assets to be searched and a location to be searched. The sensed at least three types of input gestures are translated into the search term, the class of assets to be searched and the location to be searched. The specified location is searched for the class of assets corresponding to the search term.

In another embodiment an apparatus for searching for multimedia content data is provided. A controller senses at least three types of input gestures from a user, each of the at least three input gestures representative of a respective one of a search term, a class of multimedia assets to be searched and a location to be searched. The controller translates the sensed at least three types of input gestures into the search term, the class of multimedia assets to be searched and the location to be searched and initiating a search of the location for the class of multimedia assets corresponding to the search term.

BRIEF DESCRIPTION OF THE DRAWINGS

These and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

It should be understood that the drawing(s) is for purposes of illustrating the concepts of the disclosure and is not necessarily the only possible configuration for illustrating the disclosure.

DETAILED DESCRIPTION OF PREFERRED EMBODIMENTS

It should be understood that the elements shown in the figures can be implemented in various forms of hardware, software or combinations thereof. Preferably, these elements are implemented in a combination of hardware and software on one or more appropriately programmed general-purpose devices, which can include a processor, memory and input/output interfaces. Herein, the phrase "coupled" is defined to mean directly connected to or indirectly connected with through one or more intermediate components. Such intermediate components can include both hardware and software based components.

The present description illustrates the principles of the present disclosure. It will thus be appreciated that those skilled in the art will be able to devise various arrangements that, although not explicitly described or shown herein, embody the principles of the disclosure and are included.

All examples and conditional language recited herein are intended for instructional purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which can be substantially represented in computer readable media and so executed by a computer or processor, whether or not such computer or processor is explicitly shown.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read only memory ("ROM") for storing software, random access memory ("RAM"), and nonvolatile storage.

Other hardware, conventional and/or custom, can also be included. Similarly, any switches shown in the figures are conceptual only. Their function can be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

Figure 1:
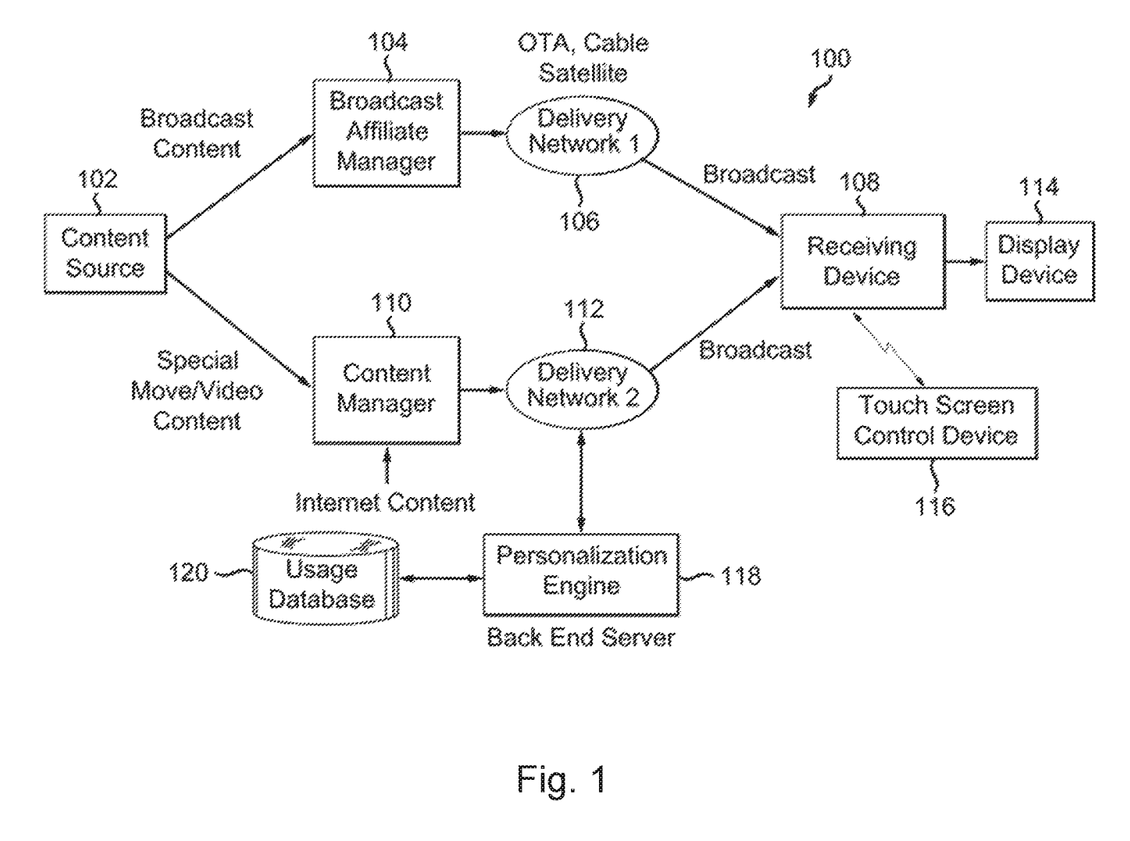
FIG. 1 is a block diagram of an exemplary system for delivering video content in accordance with the present disclosure.

Turning now to FIG. 1, a block diagram of an embodiment of a system 100 for delivering content to a home or end user is shown. The content originates from a content source 102, such as a movie studio or production house. The content can be supplied in at least one of two forms. One form can be a broadcast form of content. The broadcast content is provided to the broadcast affiliate manager 104, which is typically a national broadcast service, such as the American Broadcasting Company (ABC), National Broadcasting Company (NBC), Columbia Broadcasting System (CBS), etc. The broadcast affiliate manager can collect and store the content, and can schedule delivery of the content over a delivery network, shown as delivery network 1 (106). Delivery network 1 (106) can include satellite link transmission from a national center to one or more regional or local centers. Delivery network 1 (106) can also include local content delivery using local delivery systems such as over the air broadcast, satellite broadcast, or cable broadcast. The locally delivered content is provided to a receiving device 108 in a user's home, where the content will subsequently be searched by the user. It is to be appreciated that the receiving device 108 can take many forms and can be embodied as a set top box/digital video recorder (DVR), a gateway, a modem, etc. Further, the receiving device 108 can act as entry point, or gateway, for a home network system that includes additional devices configured as either client or peer devices in the home network.

A second form of content is referred to as special content. Special content can include content delivered as premium viewing, pay-per-view, or other content otherwise not provided to the broadcast affiliate manager, e.g., movies, video games or other video elements. In many cases, the special content can be content requested by the user. The special content can be delivered to a content manager 110. The content manager 110 can be a service provider, such as an Internet website, affiliated, for instance, with a content provider, broadcast service, or delivery network service. The content manager 110 can also incorporate Internet content into the delivery system. The content manager 110 can deliver the content to the user's receiving device 108 over a separate delivery network, delivery network 2 (112). Delivery network 2 (112) can include high-speed broadband Internet type communications systems. It is important to note that the content from the broadcast affiliate manager 104 can also be delivered using all or parts of delivery network 2 (112) and content from the content manager 110 can be delivered using all or parts of delivery network 1 (106). In addition, the user can also obtain content directly from the Internet via delivery network 2 (112) without necessarily having the content managed by the content manager 110.

Several adaptations for utilizing the separately delivered content can be possible. In one possible approach, the special content is provided as an augmentation to the broadcast content, providing alternative displays, purchase and merchandising options, enhancement material, etc. In another embodiment, the special content can completely replace some programming content provided as broadcast content. Finally, the special content can be completely separate from the broadcast content, and can simply be a media alternative that the user can choose to utilize. For instance, the special content can be a library of movies that are not yet available as broadcast content.

The receiving device 108 can receive different types of content from one or both of delivery network 1 and delivery network 2. The receiving device 108 processes the content, and provides such content based on user preferences and commands. The receiving device 108 can also include a storage device, such as a hard drive or optical disk drive, for recording and playing back audio and video content. Further details of the operation of the receiving device 108 and features associated with playing back stored content will be described below in relation to FIG. 2. The processed content is provided to a display device 114. The display device 114 can be a conventional 2-D type display or can alternatively be an advanced 3-D display.

The receiving device 108 can also be interfaced to a second screen such as a touch screen control device 116. The touch screen control device 116 can be adapted to provide user control for the receiving device 108 and/or the display device 114. The touch screen device 116 can also be capable of displaying video content. The video content can be graphics entries, such as user interface entries (as discussed below), or can be a portion of the video content that is delivered to the display device 114. The touch screen control device 116 can interface to receiving device 108 using any well known signal transmission system, such as infra-red (IR) or radio frequency (RF) communications and can include standard protocols such as infra-red data association (IRDA) standard, Wi-Fi, Bluetooth and the like, or any other proprietary protocols. Operations of touch screen control device 116 will be described in further detail below.

In the example of FIG. 1, system 100 also includes a back end server 118 and a usage database 120. The back end server 118 includes a personalization engine that analyzes the usage habits of a user and makes recommendations based on those usage habits. The usage database 120 is where the usage habits for a user are stored. In some cases, the usage database 120 can be part of the back end server 118. In the present example, the back end server 118 (as well as the usage database 120) is connected to the system 100 and accessed through the delivery network 2 (112). In an alternate embodiment, the usage database 120 and backend server 118 can be embodied in the receiving device 108. In a further alternate embodiment, the usage database 120 and back end server 118 can be embodied on a local area network to which the receiving device 108 is connected.

Figure 2:
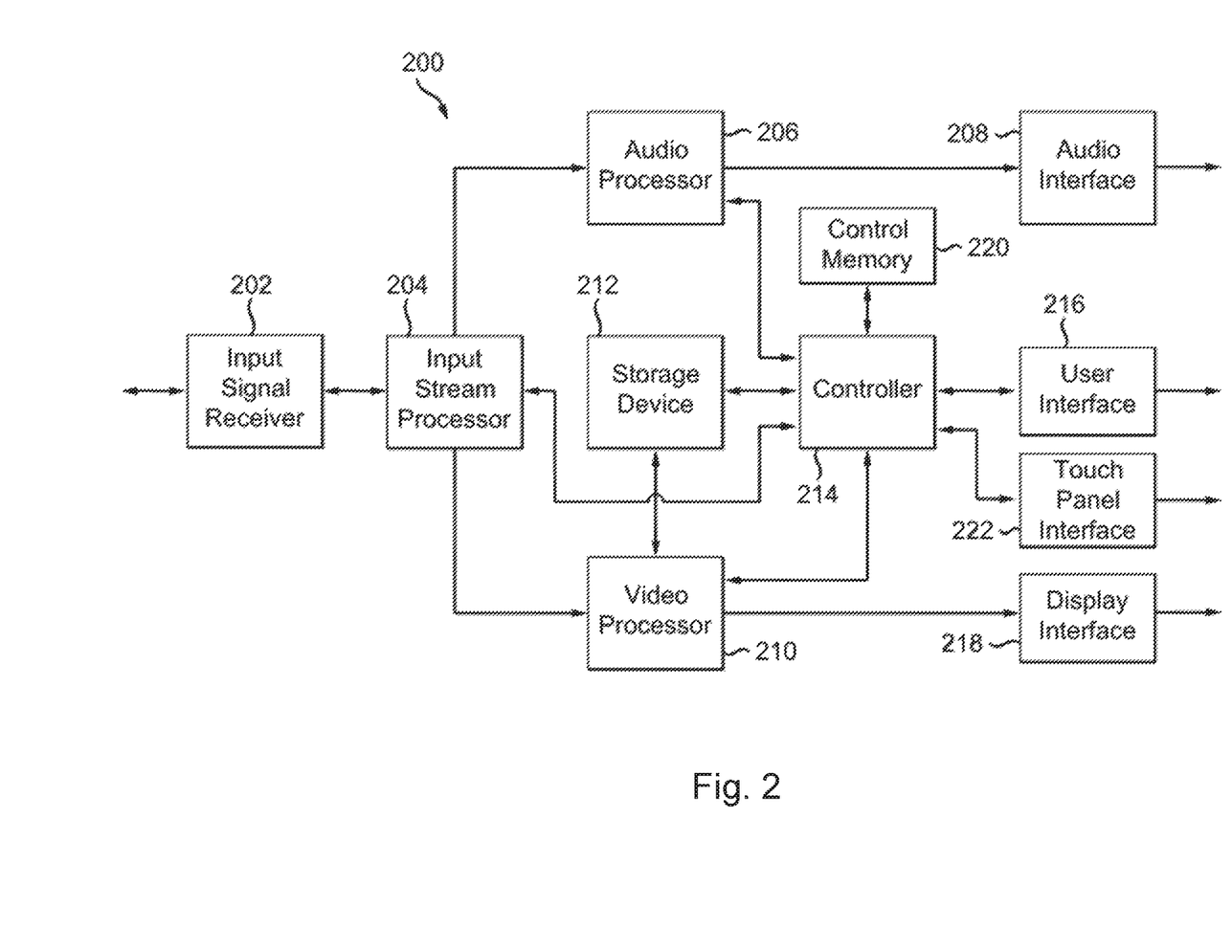
FIG. 2 is a block diagram of an exemplary set-top box/digital video recorder (DVR) in accordance with the present disclosure.

Turning now to FIG. 2, a block diagram of an embodiment of a receiving device 200 is shown. Receiving device (also known as a media device) 200 can operate similar to the receiving device described in FIG. 1 and can be included as part of a gateway device, modem, set-top box, computer, or other similar communications device. The device 200 shown can also be incorporated into other systems including an audio device or a display device. In either case, several components necessary for complete operation of the system are not shown in the interest of conciseness, as they are well known to those skilled in the art. In one exemplary embodiment, media device 200 can be a set top box coupled to a display device (e.g. television). In another embodiment, the media device can be a display device.

In the device 200 shown in FIG. 2, the content is received by an input signal receiver 202. The input signal receiver 202 can be one of several known receiver circuits used for receiving, demodulation, and decoding signals provided over one of the several possible networks including over the air, cable, satellite, Ethernet, fiber and phone line networks. The desired input signal can be selected and retrieved by the input signal receiver 202 based on user input provided through a control interface or touch panel interface 222. Touch panel interface 222 can include an interface for a touch screen device. Touch panel interface 222 can also be adapted to interface to a cellular phone, a tablet, a mouse, a high end remote or the like.

The decoded output signal is provided to an input stream processor 204. The input stream processor 204 performs the final signal selection and processing, and includes separation of video content from audio content for the content stream. The audio content is provided to an audio processor 206 for conversion from the received format, such as compressed digital signal, to an analog waveform signal. The analog waveform signal is provided to an audio interface 208 and further to the display device or audio amplifier. Alternatively, the audio interface 208 can provide a digital signal to an audio output device or display device using a High-Definition Multimedia Interface (HDMI) cable or alternate audio interface such as via a Sony/Philips Digital Interconnect Format (SPDIF). The audio interface can also include amplifiers for driving one more sets of speakers. The audio processor 206 also performs any necessary conversion for the storage of the audio signals.

The video output from the input stream processor 204 is provided to a video processor 210. The video signal can be one of several formats. The video processor 210 provides, as necessary, a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., navigation instructions such as fast-forward (FF) and rewind (RW), received from a user interface 216 and/or touch panel interface 222. The storage device 212 can be a hard disk drive, one or more large capacity integrated electronic memories, such as static RAM (SRAM), or dynamic RAM (DRAM), or can be an interchangeable optical disk storage system such as a compact disk (CD) drive or digital video disk (DVD) drive.

The converted video signal, from the video processor 210, either originating from the input or from the storage device 212, is provided to the display interface 218. The display interface 218 further provides the display signal to a display device of the type described above. The display interface 218 can be an analog signal interface such as red-green-blue (RGB) or can be a digital interface such as HDMI.

The controller 214 is interconnected via a bus to several of the components of the device 200, including the input stream processor 204, audio processor 206, video processor 210, storage device 212, and a user interface 216. The controller 214 manages the conversion process for converting the input stream signal into a signal for storage on the storage device or for display. The controller 214 also manages the retrieval and playback of stored content. Furthermore, as will be described below, the controller 214 performs searching of content either stored or to be delivered via the delivery networks, described above.

The controller 214 is further coupled to control memory 220 (e.g., volatile or nonvolatile memory, including RAM, SRAM, DRAM, ROM, programmable ROM (PROM), flash memory, electronically programmable ROM (EPROM), electronically erasable programmable ROM (EEPROM), etc.) for storing information and instruction code for controller 214. Control memory 220 can store instructions for controller 214. Control memory 220 can also store a database of elements, such as graphic elements containing content. The database can be stored as a pattern of graphic elements, such as graphic elements containing content, various graphic elements used for generating a displayable user interface for display interface 218, and the like. Alternatively, the memory can store the graphic elements in identified or grouped memory locations and use an access or location table to identify the memory locations for the various portions of information related to the graphic elements. Additional details related to the storage of the graphic elements will be described below. Further, the implementation of the control memory 220 can include several possible embodiments, such as a single memory device or, alternatively, more than one memory circuit communicatively connected or coupled together to form a shared or common memory. Still further, the memory can be included with other circuitry, such as portions of bus communications circuitry, in a larger circuit.

Optionally, controller 214 can be adapted to extract metadata, criteria, characteristics or the like from audio and video media by using audio processor 206 and video processor 210, respectively. That is, metadata, criteria, characteristics or the like that is contained in the vertical blanking interval, auxiliary data fields associated with video, or in other areas in the video signal can be harvested by using the video processor 210 with controller 214 to generate metadata that can be used for functions such as generating an electronic program guide having descriptive information about received video, supporting an auxiliary information service, and the like. Similarly, the audio processor 206 working with controller 214 can be adapted to recognize audio watermarks that can be in an audio signal. Such audio watermarks can then be used to perform some action such as the recognition of the audio signal, provide security which identifies the source of an audio signal, or perform some other service.

Furthermore, metadata, criteria, characteristics or the like, to support the actions listed above can come from a network source which are processed by controller 214.

Figure 3:
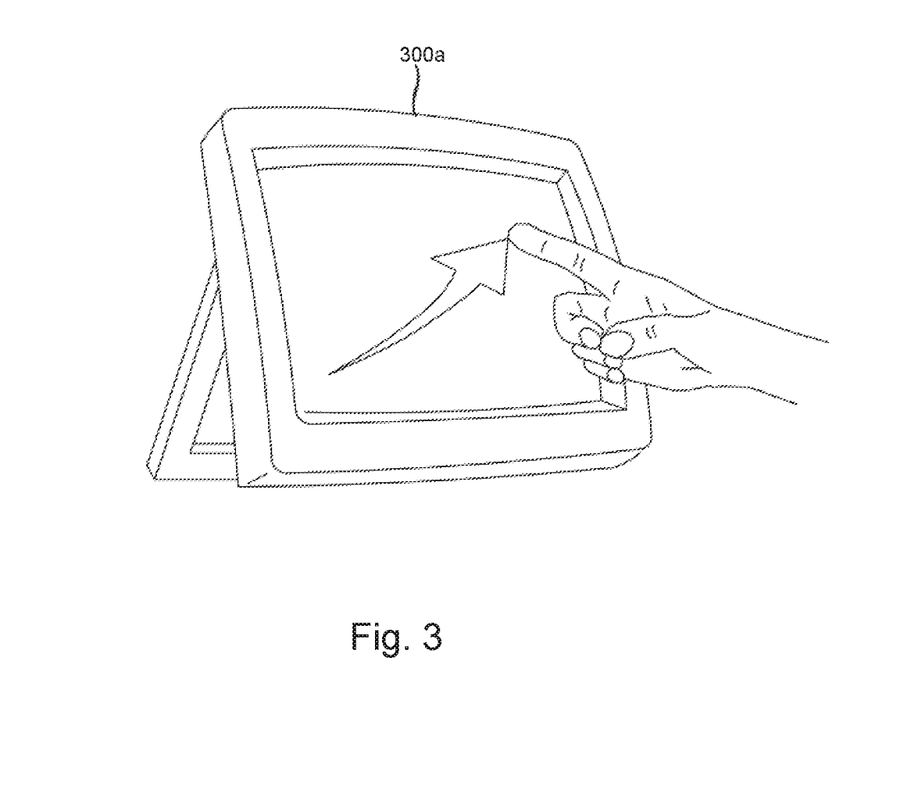
FIG. 3 is an exemplary tablet and/or second screen device in accordance with an embodiment of the present disclosure.
Figure 4:
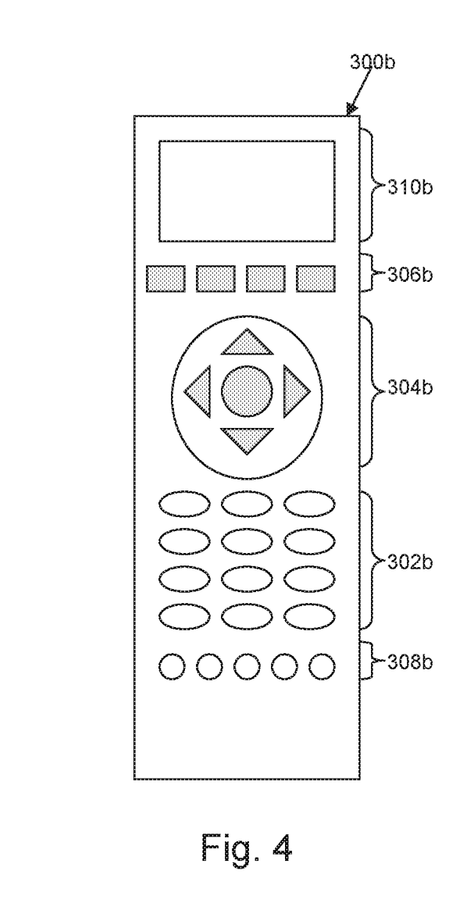
FIG. 4 is an exemplary remote controller in accordance with an embodiment of the present disclosure.

FIGS. 3 and 4 represent two exemplary input devices, 300a and 300b (hereinafter referred to collectively as input device 300), for use with the system described in FIGS. 1 and 2. The user input devices 300a and 300b enable the operation of and interaction with the user interface process according to invention principles. The input device can be used to initiate and/or select any function available to a user related to the acquisition, consumption, access and/or modification of multimedia content. FIG. 3 represents one exemplary tablet or touch panel input device 300a (which is the same as the touch screen device 116 shown in FIG. 1 and/or is an integrated example of media device 108 and touch screen device 116). The touch panel device 300a can be interfaced via the user interface 216 and/or touch panel interface 222 of the receiving device 200 in FIG. 2. The touch panel device 300a allows operation of the receiving device or set top box based on hand movements, or gestures, and actions translated through the panel into commands for the set top box or other control device. This is achieved by the controller 214 generating a touch screen user interface including at least one user selectable image element enabling initiation of at least one operational command. The touch screen user interface can be pushed to the touch screen device 300a via the user interface 216 and/or the touch panel interface 222. In an alternative embodiment, the touch screen user interface generated by the controller 214 can be accessible via a webserver executing on one of the user interface 216 and/or the touch panel interface 222. The touch panel 300a can serve as a navigational tool to navigate the grid display. In other embodiments, the touch panel 300a will additionally serve as a display device allowing the user to more directly interact with the navigation through the grid display of content. The touch panel device 300a can be included as part of a remote control device 300b containing more conventional control functions such as activator and/or actuator buttons such as is shown in FIG. 4. The touch panel 300a can also include at least one camera element and/or at least one audio sensing element.

In one embodiment, the touch panel 300a employs a gesture sensing controller or touch screen enabling a number of different types of user interaction. The inputs from the controller are used to define gestures and the gestures, in turn, define specific contextual commands. The configuration of the sensors can permit defining movement of a user's fingers on a touch screen or can even permit defining the movement of the controller itself in either one dimension or two dimensions. Two-dimensional motion, such as a diagonal, and a combination of yaw, pitch and roll can be used to define any three-dimensional motions, such as a swing. Gestures are interpreted in context and are identified by defined movements made by the user. Depending on the complexity of the sensor system, only simple one dimensional motions or gestures can be allowed. For instance, a simple right or left movement on the sensor as shown here can produce a fast forward or rewind function. In addition, multiple sensors could be included and placed at different locations on the touch screen. For instance, a horizontal sensor for left and right movement can be placed in one spot and used for volume up/down, while a vertical sensor for up and down movement can be placed in a different spot and used for channel up/down. In this way specific gesture mappings can be used. For example, the touch screen device 300a can recognize alphanumeric input traces which can be automatically converted into alphanumeric text displayable on one of the touch screen device 300a or output via display interface 218 to a primary display device.

The system can also be operated using an alternate input device 300b such as the one shown in FIG. 4. The input device 300b can be used to interact with the user interfaces generated by the system and which are output for display by the display interface 218 to a primary display device (e.g. television, monitor, etc). The input device 300b of FIG. 4 can be formed as a conventional remote control having a 12-button alphanumerical key pad 302b and a navigation section 304b including directional navigation buttons and a selector. The input device 300b can also include a set of function buttons 306b that, when selected, initiate a particular system function (e.g. menu, guide, DVR, etc). Additionally, the input device 300b can also include a set of programmable application specific buttons 308b that, when selected, can initiate a particularly defined function associated with a particular application executed by the controller 214. As discussed above, the input device can also include a touch panel 310b that can operate in a similar manner as discussed above in FIG. 3. The depiction of the input device in FIG. 4 is merely exemplary and the input device can include any number and/or arrangement of buttons that enable a user to interact with the user interface process according to invention principles. Additionally, it should be noted that users can use either or both of the input devices depicted and described in FIGS. 3 and 4 simultaneously and/or sequentially to interact with the system.

In another embodiment, the user input device can include at least one of an audio sensor and a visual sensor. In this embodiment, the audio sensor can sense audible commands issued from a user and translate the audible commands into functions to be executed by the user. The visual sensor can sense the user(s) presence and match user information of the sensed user(s) to stored visual data in the usage database 120 in FIG. 1. Matching visual data sensed by the visual sensor enables the system to automatically recognize the user(s) present and retrieve any user profile information associated with those user(s). Additionally, the visual sensor can sense physical movements of at least one user present and translate those movements into control commands for controlling the operation of the system. In this embodiment, the system can have a set of pre-stored command gestures that, if sensed, enable the controller 214 to execute a particular feature or function of the system. An exemplary type of gesture command can include the user waving their hand in a rightward direction which can initiate a fast forward command or a next screen command or a leftward direction which can initiate a rewind or previous screen command depending on the current context. This description of physical gestures able to be recognized by the system is merely exemplary and should not be taken as limiting. Rather, this description is intended to illustrate the general concept of physical gesture control that can be recognized by the system and persons skilled in the art could readily understand that the controller can be programmed to specifically recognize any physical gesture and allow that gesture to be tied to at least one executable function of the system.

In the context of the present system, a novel search processor and searching mechanism is described. A user is advantageously able to conduct searches for media content and recommendations using a series of gestures input by the user and sensed by the search processor. In one embodiment, the series of gestures can be input using a touch-sensitive input device such as a tablet or a trackpad. Alternatively, the gestures input by the user can be sensed by a motion sensor (e.g. KINECT®). Enabling a user to input a series of gestures representing elements of a search syntax advantageously provides a user with the ability to specify a "context" associated with the search to be performed. This context enables the user, prior to processing a search term, to specify a type of result that will be returned as well as one of the location to be searched and/or a particular search application to be used to process the search. In another embodiment, the gestures input by the user can also be used to identify to whom those search results apply using data from a user profile for that user.

The search syntax used in accordance with the present disclosure principles includes at least three search elements associated with a particular type of gesture entered by the user. Each search element represents a filtering characteristic used in providing context-based searching to the user. A first search element uses an input gesture to represent a search query term. In one embodiment, the input gesture representing the search query term can be formed from a plurality of sub-gestures that, when combined, complete the search query term (e.g. a series of gestures representing alphanumeric characters can be combined into a word or portion thereof).

A second search element uses an input gesture to represent the class of multimedia assets to be searched. For example, the class of multimedia assets includes, but is not limited to, (a) movies, (b) music, (c) television shows, (d) books, (e) interactive presentations, (f) streaming video, (g) streaming audio, and (h) video games. Additionally, it should be noted that these classes of multimedia assets are not necessarily embodied in a particular form or format. Thus, if the selected multimedia asset class is "movies", any resulting search will attempt to locate all formats of movies, whether they be stored in a dedicated file having a particular file format, stored in a streaming format, available via broadcast, or available through a digital locker as explained below in exemplary embodiments. By identifying a particular class of multimedia assets, a user advantageously filters out other types of multimedia assets from any search results.

A third search element uses an input gesture to represent the sources to be searched. The sources to be searched can include particular data storage locations positioned locally or on a communication network (e.g. cloud storage facility). In one embodiment, the particular data storage location can include a hard drive of a set top box that includes DVR storage. In another embodiment, the data storage location can include a user's personal cloud storage account (e.g. DROPBOX®, IDRIVE®, and the like). The sources to be searched can also include particular search applications used to search a set of content provided by a content provider. For example, the input gesture could represent an instruction to direct a content provider such as AMAZON®, NETFLIX®, and the like to look for the multimedia asset specified in the second search element.

A fourth search element uses an input gesture to represent a user profile for which the search is being performed. This can include the user actually inputting the gesture or another user who will view the selected type of media asset (e.g. a child). This input gesture allows the search algorithm to include therein, preferences, information and restrictions associated with a particular user profile. Thus, the results of any search that includes this input gesture will further restrict the results returned from the search. The fourth input gesture can be a symbol, a letter, a number, and the like.

The above description of the first through fourth search elements is not intended to convey a particular order that these search elements are entered by a user. Nor should the description of these search elements as being first through fourth be construed as the order in which these gestures are processed by the present system. Thus, gestures representative of the respective search elements can be entered in any manner and in any order. In an alternative embodiment, the described gestures can be ordered in a specific order in accordance with the exemplary principles.

Figure 5A:
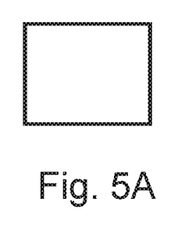
FIGS. 5A-5D illustrate exemplary gestures in accordance with the present disclosure.
Figure 5B:
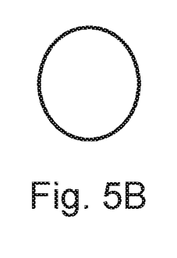
Figure 5C:
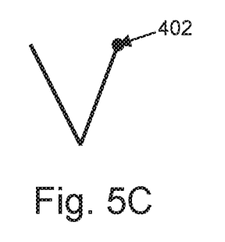
Figure 5D:
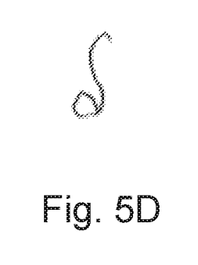

The gestures input by the user and used as search elements can include at gestures representing least one of (a) alphanumeric characters, (b) geometric patterns, (c) non-geometric patterns, and (d) directional movements. For example, the input gestures representing the search query term can be entered via input of gestures representing alphanumeric characters whereas the input gestures representing the class of media assets can be entered by inputting a predetermined pattern that is associated with the particular type of media asset. Examples of predetermined patterns are shown in FIGS. 5A-5D. In FIG. 5A, the predetermined pattern is a "square". This pattern can be associated with the class of multimedia assets including "Books". In FIG. 5B, the predetermined pattern is a "circle". This pattern can be associated with the class of multimedia assets including "movies". In FIG. 5C, the predetermined pattern is a "V" and requires the addition of a "tap" action indicated by the dot labeled with reference numeral 402. This pattern and action can be associated with the class of multimedia assets including "television shows". In FIG. 5D, the predetermined pattern is a "music note". This pattern can be associated with the class of multimedia assets including "music".

The predetermined patterns described and shown in FIG. 5A-5D are shown for purposes of example only. The patterns shown herein are not restricted to the class of multimedia asset with which it is described but can be associated with any of the other classes of multimedia assets so long as the pattern is unique to a respective class of multimedia assets. Additionally, these patterns are not the only types and styles of patterns able to be recognized by the present system. Instead, and as will be discussed later, the search algorithm can employ a pattern data file or lookup table to compare with any gesture input by a user and translate that input gesture into an element usable by the search algorithm.

It is also to be understood that an input gesture of either predetermined patterns or alphanumeric characters can be used when entering the search elements. This advantageously provides the user with wide latitude in specifying the location or locations to be search as well as the particular sources and applications for searching those sources. For example, data storage locations can include their own unique patterns associated therewith. Thus, if the user wishes to search their own cloud storage data store, the user can enter the predetermined pattern associated with the storage provider. Content providers and search applications can similarly also be associated with respective patterns. Alternatively, if a source of content or data storage location does not have a unique pattern associated therewith, the user can enter alphanumeric character gestures that are translated by the system to ensure that the correct location and/or source and/or application is used when implementing the search.

Figure 6:
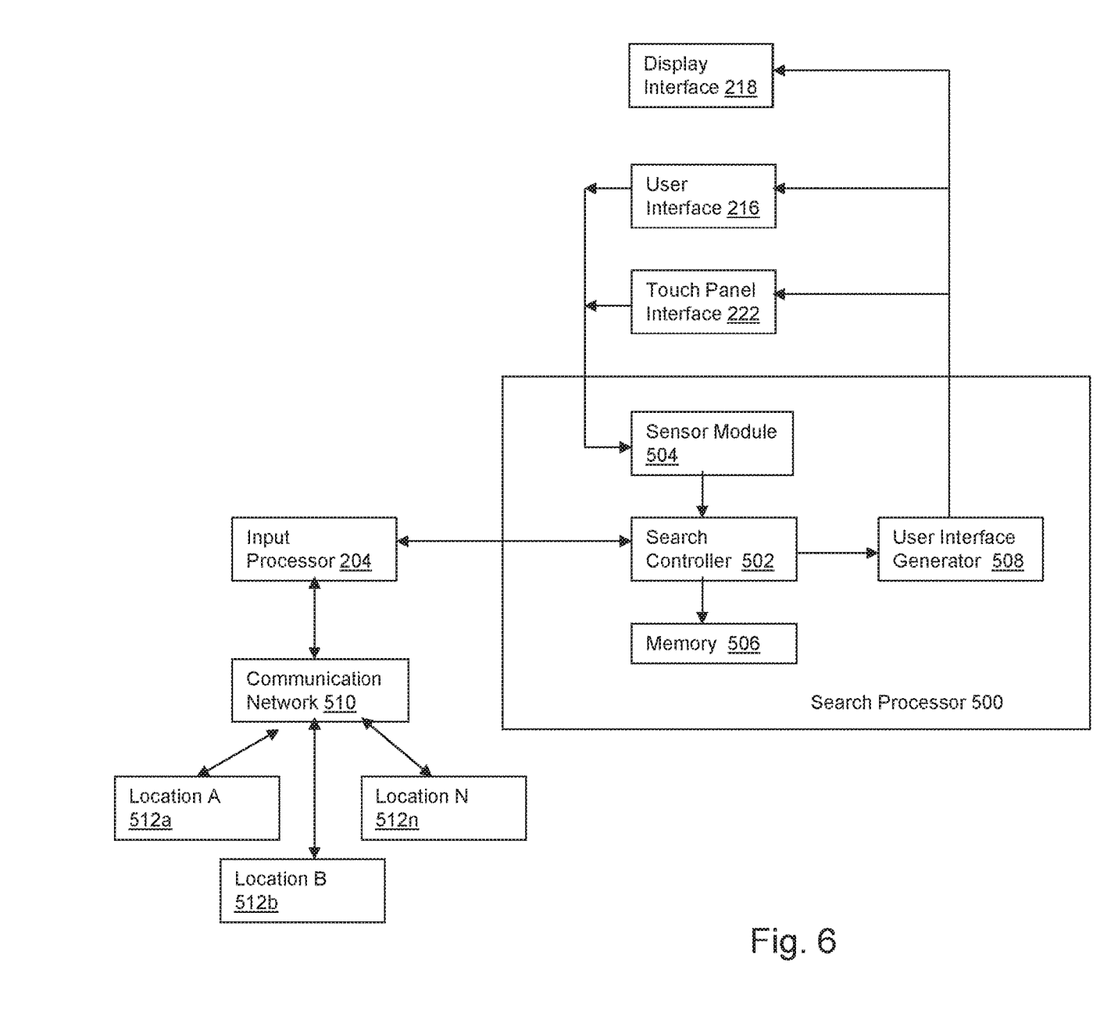
FIG. 6 is a block diagram of a search apparatus in accordance with the present disclosure.

FIG. 6 is a block diagram of a search processor 500 that implements the principles of the present invention. While the search processor 500 is shown as a distinct component, the search processor 500 can also be embodied as part of the controller 214 in FIG. 2. Alternatively, the search processor 500 can be a dedicated processor that is electrically coupled to the controller 214 in FIG. 2 as well as to other elements of FIG. 2 as will be discussed. Thus, while in a first embodiment the search processor 500 can be included as part of receiving device 200 in FIG. 2, the search processor 500 can, in an alternative embodiment, be a standalone circuit included in an electronic device able to access and search for different classes of multimedia assets.

The search processor 500 includes a search controller 502. The search controller 502 includes computer implemented instructions for executing a context-based search algorithm using the above described search syntax. The search syntax includes at least three gesture-based search elements. The at least three gesture-based search element include a search query term, a class of multimedia assets to be searched and at least one of a location at which the selected class of multimedia assets are stored and/or are made available. In another embodiment, the search processor 502 can also use a fourth element that identifies a user/user profile for whom the search is being performed as part of the context-based search.

A sensor module 504 is coupled to the search controller 502 and senses signals representing gestures input which can be included as a respective one of the search elements. The sensor module 504 receives signals representing input gestures from one of the user interface 216 and/or the touch screen interface 218. These interfaces 216, 218 operate in a similar manner to those having the same reference numeral in FIG. 2 and need not be discussed further. In one embodiment, a user using a touch screen input device 300a in FIG. 3 can input a gesture by tracing at least their finger or a stylus on the screen. The touch screen input device 300 transmits data representing the gesture to the touch screen interface 218 as an input signal which is then provided to the sensor module 504. The sensor module 504 senses the input signal, identifies the gesture and provides the identified gesture to the search controller 502. The search controller 502 translates the gesture into the respective search element syntax for use when executing the context based search algorithm. The search controller 502 is able to determine the search element that was sensed by the sensor module 504.

A memory 506 is coupled to the search controller 502 and includes translation data that is selectively used by the search controller 502 in translating the user-entered input gesture into its corresponding search element. The translation data can include a series of gestures that, when sensed by the sensor module 504 and provided to the search controller 502, are used as comparison points for translating the gesture into an element that is useable as part of the context-based search syntax according to invention principles. This translation data can include at least one of (a) gestures representing respective alphanumeric characters, (b) predetermined patterns associated with respective classes of multimedia assets, (c) predetermined patterns associated with respective locations to be searched, (d) predetermined patterns associated with respective applications used to execute the search, and (e) predetermined patterns associated with respective sources of content available for search. In another embodiment, the translation data can also include at least one of (a) directional gestures used to identify a particular user for which the search is being performed, and (b) predetermined patterns associated with respective user profiles.

The search processor 500 also includes a user interface generator 508. The user interface generator 508 is controlled to generate a search interface enabling a user to enter input gestures for use as respective search elements. The search interface is provided to at least one of (a) the display interface 218 for display on display device 114 (FIG. 1), (b) the user interface for output to the user input device 300b (FIG. 4), and (c) a touch panel interface for output to a touch sensitive display device 300a (FIG. 3). The search user interface generated by the UI generator 508 includes at least one region for receiving input gestures from the user. In this instance, when the user inputs gestures in the at least one region, region data is provided as part of the input signal sensed by the sensor module 504 thereby advantageously identifying the search element that is to be generated from the respective input gesture. Exemplary user interfaces for receiving user input gestures will be described hereinafter with respect to FIGS. 7 and 8.

Upon translation by the search controller 502 of all user input gestures, the search controller 502 executes the context-based search algorithm using the search elements as seed terms. The controller 502 communicates with the input processor 204 (FIG. 2) and searches locations and/or sources for the selected class of multimedia assets for particular multimedia assets corresponding to the search term, all of which were entered using a gesture based input. This search can occur locally by searching the storage device 212 or, remotely, via a communication network 510 that is coupled to a plurality of locations and/or sources 512a, 512b and 512n. The results of the search are provided back to the search controller 502 via the input processor 204. The search controller 502 causes the UI generator 508 to generate at least one user interface including a list of multimedia assets present at the searched location corresponding to the search term.

Figure 7:
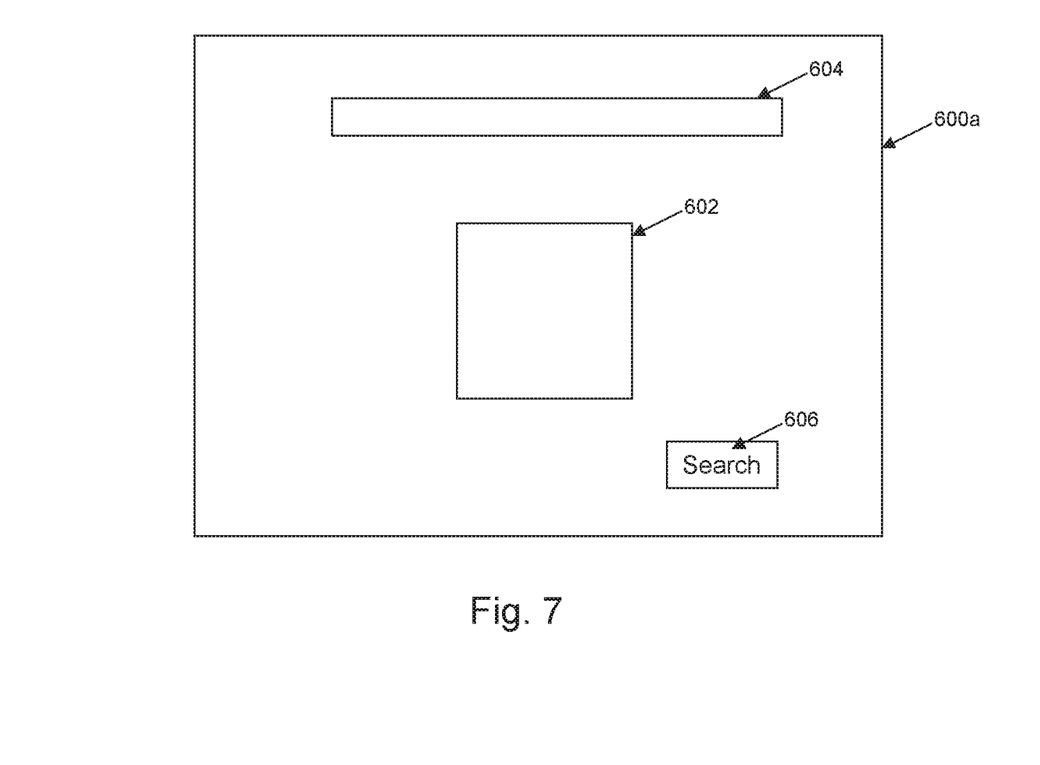
FIGS. 7 and 8 are exemplary user interfaces in accordance with the present disclosure.
Figure 8:
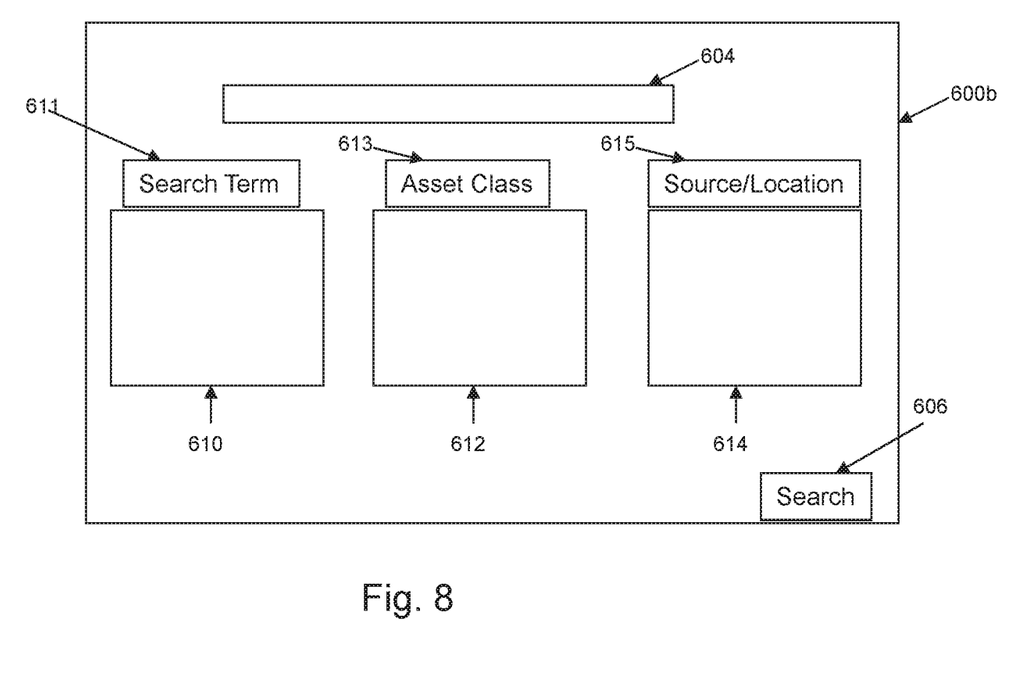

FIGS. 7 and 8 represent exemplary user interface display images generated by the UI generator 508 in FIG. 6. In FIG. 7, the UI generator 508 generates a user interface display image 600a enabling receipt of gesture based corresponding to at least one search element of the search syntax used in accordance with invention principles. UI display image 600a includes an input region 602 that enables a user to input a gesture representing a respective search element therein. The input region 602 is shown herein as covering a portion of the UI display image 600. However, this is for purposes of example only and the input region 602 can be of any shape or size within the UI display image 600a. Alternatively, the entire area of the UI display image 600 can be the input region 602. The UI display image 600 also includes a search syntax display region 604 that displays to the user the particular search elements that were determined by the search processor 500 in FIG. 6 to correspond to the gestures entered within input region 602. The UI display image 600 also includes a search image element 606 that is a user selectable image element that, upon selection thereof, will initiate a context-based search algorithm using the search elements displayed in region 604 as seed terms.

In an exemplary embodiment, an input gesture by a user taking the form of at least one of a finger trace and a stylus trace is received within input region 602. Data representative of the input gesture is sensed by the sensor module 504 in FIG. 6 and provided to the search controller 602 which translates the gesture into a respective search element. The translated search element is provide to the UI generator 608 which automatically updates the syntax display region 604 within User Interface 600.

Because the search syntax can use at least three search elements, the search processor 500 enables the user to input respective search element identifying gestures within input region 602. By inputting a predetermined search element identifying gesture, the user can convey to the search controller that the next gesture entered within input region represents a particular search element. Additionally, the search processor 500 enables a user to enter a next element gesture such that, upon the sensor module 504 sensing a gesture representing a next element, the search controller 502 understands that all gestures related to the previous search element have been entered and looks for a further search element identifying gesture as the next input gesture. The use of next element gesture is particularly advantageous when a user wishes to generate a search element by using a series of alphanumeric gestures (e.g. sub-gestures). In this manner, the search controller 502 will be notified that the search element being entered is formed from a plurality of sub-gestures. This can also reduce the error rate of gesture based inputs by preventing the system from prematurely skipping to a next search element before the prior search element is completely entered by the user.

In one embodiment, as input gestures are received within input region 602 and sensed by the sensor module 504, the search controller 502 can automatically provide at least one candidate search element in real-time based on the sensed gestures. For example, if the input gestures are alphanumeric input gestures and the search element for which these alphanumeric input gestures is a search query term, as the search controller 502 translates the alphanumeric gestures sensed by the sensor module 504, the search controller 502 can generate a candidate search elements that can be derived from the sensed alphanumeric input gestures. Thus, the search controller 502 can provide a candidate search element "Ben Affleck" upon sensing input of gestures corresponding to "BE". Additionally, the candidate search elements can be continually updated upon receipt and translation of further alphanumeric gestures. In one embodiment, the candidate search elements can be presented in the syntax region 604 in the user interface display image 600. In another embodiment, the user interface display image 600 can include a region therein for displaying the at least one candidate search element.

In another embodiment, the input region 602 can include an identifier associated therewith. The identifier assigns the input gesture received within input region 602 to a particular search element. The identifier can be selectively changed to be any of the search element described above. In operation, upon selection of a respective identifier, a search element identifier is communicated as part of the input signal along with the input gesture. The sensor module 504 not only senses the input gesture but also uses the identifier to instruct the search controller 502 as to which search element is being input by the user. When the user completes the input gesture for that particular search element, the identifier can be changed to a further different identifier associated with a further search element thereby causing the search controller 502 to apply any further input gesture(s) to the further search element.

FIG. 8 is an alternative embodiment of a user interface display image 600b for receiving input gestures from a user. In this embodiment, the UI display image 600b includes at least three input regions 610, 612 and 614 each corresponding to a respective type of search element. Each of the input regions 610, 612 and 614 includes respective identifiers 611, 613, and 615 that identify the type of search element able to be input therein. This advantageously provides a UI display image whereby input gestures received a different input regions 610, 612 and 614 are automatically associated with a particular type of search element. This ensures that input gestures entered in respective regions are only translated and used for the particular associated search element. For example, the first input region 610 includes a first identifier 611 indicating that any gestures input into region 610 will be automatically associated with the search element "search term". The second input region 612 includes a second identifier 613 indicating that any gestures input into region 612 will be automatically associated with the search element "asset class". Finally, the third input region 614 includes a third identifier 615 indicating that any gestures input into region 614 will be automatically associated with the search element "source/location". This arrangement is described for purposes of example only and the input regions and associated identifiers can be arranged in any manner. In a further embodiment, a fourth input region and associated identifier can be included automatically associating any gestures input therein with the search element "user profiles". In another embodiment, each of the identifiers 611, 613 and 615 can be selectively changed into any other of the identifiers. This can be done, for example, by selecting a respective identifier and selecting a respective type of search element from a set of candidate search elements.

Exemplary operation of the present system will be discussed below with specific reference to FIGS. 9A-9B. Generally, the following represents the translation of gestures into search elements. An input gesture input by a user can correspond to the first search element, search query term causing the search controller 502 in FIG. 6 to look for alphanumeric input gestures. For example, a user can draw (or trace) an "A" if the user wanted a search query term to use "A" while the person would draw a "B" if a "B" was desired to be part of the search query term. The search controller 502 can employ alphanumeric character recognition techniques when translating the input gesture into the letter represented thereby. A search query could be a single or a plurality of letters, as well. Such a search query can then be seeded into a search engine.

An input gesture input by a user can correspond to the second search element, class of media asset, causing the search controller 502 in FIG. 6 to look for at least one of a predetermined pattern associated with a particular class of media assets and alphanumeric input gestures identifying a particular class of media assets. The search controller 502 compares the predetermined patterns or symbols sensed by the sensor module 504 with a set of predetermined patterns or symbols associated with classes of media assets. Upon determining an input gesture representing a pattern/symbol matches a particular class of media assets, the search controller 502 adds that class of asset as the second search element of the search syntax. This results in the return of the corresponding media assets that include the search term entered above. Functionally, the use of these symbols after entry of the first search element (search term) adds an attribute to the search syntax such as +book, +movie, +music, +television, and the like.

An input gesture input by a user can correspond to the third search element, location to be searched/source to be searched, causing the search controller 502 in FIG. 6 to look for at least one of a predetermined pattern associated with a particular location and/or source to be searched and alphanumeric input gestures identifying a particular location and/or source to be searched. For example, if alphanumeric terms are used, an "A" can represent "Amazon", "G" can represent "Google", and "M" would represent "M-Go". In other embodiments, these sources/locations can be associated with predetermined patterns as well. The search controller 502 compares the predetermined patterns or symbols sensed by the sensor module 504 with a set of predetermined patterns or symbols associated with locations/sources to be searched. Upon determining an input gesture representing a pattern/symbol and/or alphanumeric characters match a particular source/location to be searched, the search controller 502 adds that location as the third search element of the search syntax. This results in the return of the corresponding media assets that include the search term entered above that can be located at the identified source/location.

In an optional embodiment, an input gesture input by a user can correspond to a fourth search element, where a user performing a search, causes the search controller 502 in FIG. 6 to look for at least one of a predetermined pattern associated with a particular user and alphanumeric input gestures identifying a particular user performing the search. A user can then provide a symbol or alphanumeric term to represent for who the search results are to pertain. For example, a swipe down (towards a user) can indicate that the results should be relevant to the user who is operating the user interface device. Alternatively, a swipe up which is going away from a user can represent a search for materials relevant to the public at large. Symbols such as "M" can represent "Mom", "D" for "Dad", and "C" for child, if multiple profiles are associated with a device. In terms of matching search results for a person, the search results that are returned for a particular user can be the materials that the person has access to through their digital locker or through a media service. For example, a user using a swipe down motion can have access to content that "Mom" does not.

Figure 9A:
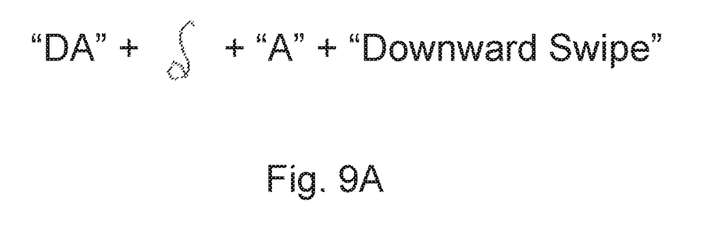
FIGS. 9A & 9B are exemplary search syntaxes in accordance with the present disclosure.
Figure 9B:
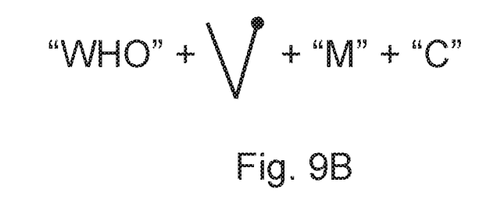

The above discussed operation principles resulting in search syntax generated from user input gestures is illustrated in FIGS. 9A and 9B. In the example shown in FIG. 9A the input gestures seed search syntax using a query starting with "DA" (e.g. first search element of search term) to locate music (e.g. second search element of asset class resulting from input of a music note pattern) in Amazon's (inputting an "A" as the third search element for location/source) as a database and uses the profile for the user inputting the gestures (e.g. the downward swipe for the fourth search element of user profile). In the example shown in FIG. 9B the input gestures seeds search syntax using a query starting with "WHO" (e.g. first search element of search term) to locate a television show (e.g. second search element of asset class resulting from input of a V with a tap action) in M-GO's database (inputting an "M" as the third search element for location/source) and uses the profile for a child (e.g. entering a "C" for the fourth search element of user profile).

Figure 10:
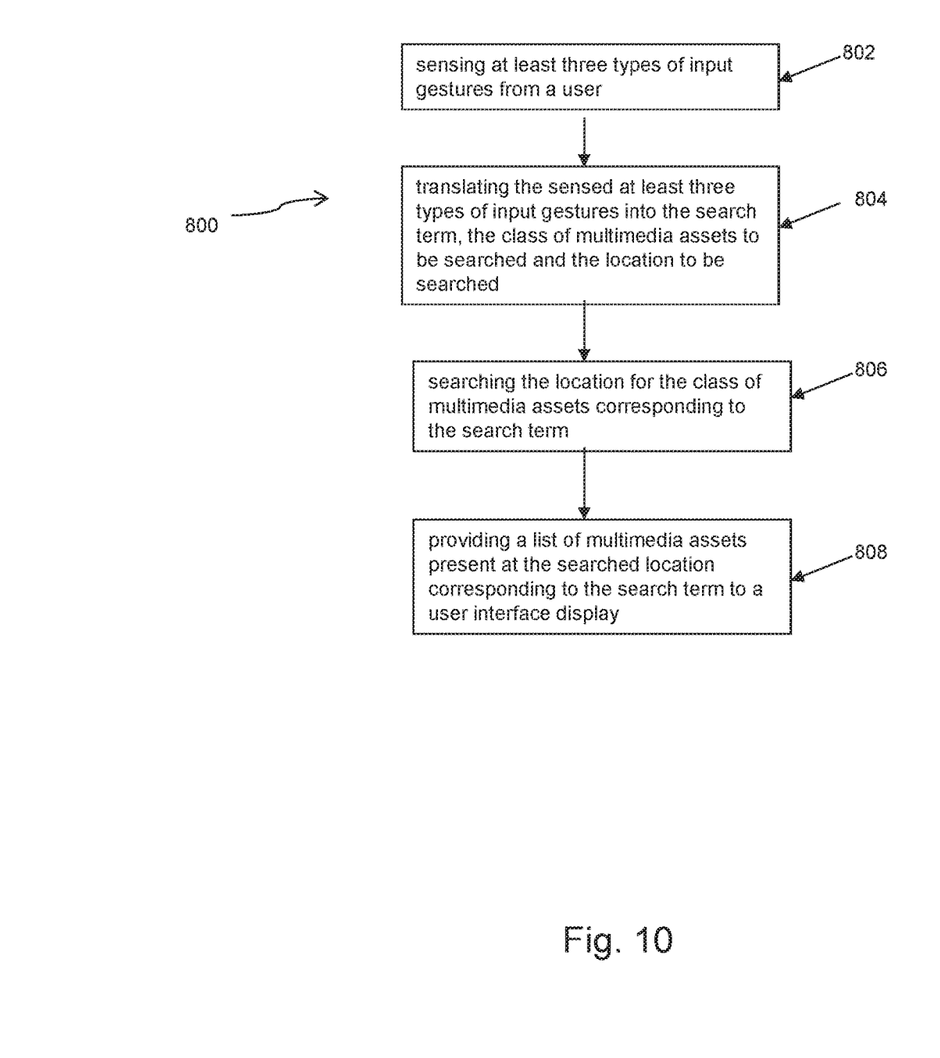
FIG. 10 is an exemplary flowchart of the method in accordance with the present disclosure.

FIG. 10 is a flow diagram 800 detailing the operation of the system according to invention principles. Flow diagram 800 details an algorithm for searching for multimedia content data. In step 802, at least three types of input gestures are sensed from a user. The gestures input in step 802 can be input on a touch sensitive input device or via a motion sensor that senses motions indicative of the at least three input gestures. Each of the at least three input gestures representative of a respective one of a search term, a class of multimedia assets to be searched and a location to be searched. The at least three types of input gestures can include at least one of (a) a gesture indicative of an alphanumeric characters for generating the search term, (b) a first pattern indicative of a particular class of multimedia objects, and (c) a second pattern indicative of at least one of a particular location to be search and a particular search engine to be used in completing the search. In one embodiment, the one of the at least three input gestures translated into the search term includes a plurality of sub-gestures, each sub-gesture representing a respective alphanumeric character, wherein a combination of sub-gestures is used to generate the search term.

In a further embodiment, a user interface is generated and enables the input of the at least three types of input gestures. The user interface can include a single input region enabling input of the at least three types of input gestures. Alternatively, the generated user interface includes at least three input regions, each of the at least three input regions corresponding to a respective one of the at least three input gestures. In a further embodiment, a field within a respective region of one of the at least three input regions is autopopulated with candidate search terms based on at least sensing input of a portion of the input gesture.

In an additional embodiment, the generated user interface can also enable a user to identify a respective gesture with at least one of (a) a class of multimedia assets, and (b) a location to be searched and/or enable a user to identify the respective one of the at least one of the gestures prior to input thereof.

In an optional embodiment, step 802 can include sensing a further input gesture from a user and translating the further input gesture into information identifying a user profile and modifying the list of multimedia assets to account for restrictions within the user profile. The restrictions the user profile can include data representing at least one of (a) at least one preference describing multimedia content of interest to the user, (b) sources available to the user for searching thereof, (c) at least one type of multimedia content to be excluded from a search, (d) digital rights management associated with the user, (e) multimedia content that is unavailable to the user, and (e) at least one type of multimedia content available to the user.

In step 804, the sensed at least three types of input gestures are translated into the search term, the class of multimedia assets to be searched and the location to be searched. In step 806, the location is searched for the class of multimedia assets corresponding to the search term. In step 808, a list of multimedia assets present at the searched location corresponding to the search term is provided to a user interface display.

Although embodiments which incorporate the teachings of the present disclosure have been shown and described in detail herein, those skilled in the art can readily devise many other varied embodiments that still incorporate these teachings. Having described preferred embodiments of a system, method and user interface for content search (which are intended to be illustrative and not limiting), it is noted that modifications and variations can be made by persons skilled in the art in light of the above teachings. It is therefore to be understood that changes can be made in the particular embodiments of the disclosure disclosed which are within the scope of the disclosure as outlined by the appended claims.

The invention claimed is:

1. A method of searching for content data, the method comprising:
   sensing a first gesture indicating a search term;
   sensing a second gesture indicating a class of multimedia assets to be searched;
   sensing a third gesture indicating a data storage location of the class of the multimedia assets to be searched; and
   performing a search based on the first, second, and third gestures, wherein the search includes searching the one of the storage location for the class of the multimedia assets corresponding to the search term;
   generating a graphical user interface that includes a first input region for sensing the first gesture, a second input region for sensing the second gesture, and a third input region for sensing the third gesture, wherein the first, second, and third input regions are separate input regions.

2. The method of claim 1 wherein the multimedia assets include movies.

3. The method of claim 1 wherein the multimedia assets include music.

4. The method of claim 1 wherein the multimedia assets include television shows.

5. The method of claim 1 wherein the multimedia assets include streaming audio and video.

6. The method of claim 5 wherein the multimedia assets include video games.

7. The method of claim 1 wherein the data storage location include at least a local data storage location and a cloud data storage facility.

8. The method of claim 1, further comprising providing a list of assets present at the searched location corresponding to the search term.

9. The method of claim 1, further comprising:
   sensing a fourth gesture indicating a user profile, wherein performing the search is further based on the fourth gesture; wherein the user profile indicates a restriction; and
   modifying the list of assets based on the restriction.

10. The method of claim 9, wherein the restriction includes at least a preference describing content of interest to the user, a source available to the user for searching thereof, a type of content to be excluded from searching, a digital rights management associated with the user, a type of content that is unavailable to the user, or a type of content available to the user.

11. An apparatus for searching for content data, the apparatus comprising:
    a touch sensor that senses a first gesture indicating a search term, that senses a second gesture indicating a class of multimedia assets to be searched, and that senses a third gesture indicating a data storage location of the class of the multimedia assets to be searched; and
    a controller that performs a search based on the first, second, and third gestures, wherein the controller searches the one of the storage locations for the class of the multimedia assets corresponding to the search term
    said controller having a processor configured for generating a graphical user interface that includes a first input region for sensing the first gesture, a second input region for sensing the second gesture, and a third input region for sensing the third gesture, wherein the first, second, and third input regions are separate input regions.

12. The apparatus of claim 11 wherein the class of the multimedia assets include movies and music.

13. The apparatus of claim 11 wherein the class of the multimedia assets include streaming video and streaming audio.

14. The apparatus of claim 11 wherein the data storage location include at least a local data storage location and a cloud data storage facility.

15. The apparatus of claim 11 further comprising:
    a display; and
    a user interface generator in communication with said processor that generates a graphical user interface on the display, wherein the graphical user interface includes a list of assets present at the searched location corresponding to the search term.

16. The apparatus of claim 11 further comprising:
    a display; and
    a graphical user interface in communication with said processor that generates a graphical user interface on the display.

17. The apparatus of claim 11, wherein the touch sensor further senses a fourth gesture indicating a user profile, and the search performed by the controller is further based on the fourth gesture; wherein the user profile indicates a restriction, and the controller modifies the list of assets based on the restriction.

18. The apparatus of claim 17, wherein the restriction includes at least a preference describing content of interest to the user, a source available to the user for searching thereof, a type of content to be excluded from searching, a digital rights management associated with the user, a type of content that is unavailable to the user, or a type of content available to the user.

19. A non-transitory computer-readable medium storing computer-executable instructions executable to perform searching for content data comprising:
    sensing a first gesture indicating a search term;
    sensing a second gesture indicating a class of multimedia assets to be searched, sensing a third gesture indicating a data storage location of the class of the multimedia assets to be searched, and
    performing a search based on the first, second, and third gestures, wherein the search includes searching the one of the storage locations for the class of the multimedia assets corresponding to the search term;
    generating a graphical user interface that includes a first input region for sensing the first gesture, a second input region for sensing the second gesture, and a third input region for sensing the third gesture, wherein the first, second, and third input regions are separate input regions.

* * * * *